(12) United States Patent
Gamoh et al.

(10) Patent No.: US 8,771,875 B2
(45) Date of Patent: Jul. 8, 2014

(54) SUBSTANCE AND BATTERY INCLUDING THE SAME

(75) Inventors: Yoshinori Gamoh, Fukushima (JP); Hiroshi Imoto, Fukushima (JP)

(73) Assignee: Sony Corporation, Tokyo (JP)

( * ) Notice: Subject to any disclaimer, the term of this patent is extended or adjusted under 35 U.S.C. 154(b) by 694 days.

(21) Appl. No.: 12/200,635

(22) Filed: Aug. 28, 2008

(65) Prior Publication Data

US 2009/0068559 A1 Mar. 12, 2009

(30) Foreign Application Priority Data

Sep. 12, 2007 (JP) ................. 2007-236371

(51) Int. Cl.
*H01M 4/48* (2010.01)
*H01M 4/50* (2010.01)
*H01M 4/52* (2010.01)

(52) U.S. Cl.
USPC ........ 429/220; 429/218.1; 429/221; 429/223; 429/224

(58) Field of Classification Search
USPC ............ 429/231.3, 220, 221, 223, 224, 218.1
See application file for complete search history.

(56) References Cited

U.S. PATENT DOCUMENTS

| | | | |
|---|---|---|---|
| 2004/0234859 A1 | 11/2004 | Lee et al. | |
| 2004/0258984 A1 * | 12/2004 | Ariel et al. | ............. 429/152 |
| 2007/0207384 A1 * | 9/2007 | Nakura | ............. 429/231.1 |

FOREIGN PATENT DOCUMENTS

| | | | |
|---|---|---|---|
| JP | 55-155468 | 12/1980 | |
| JP | 8-111233 | 4/1996 | |
| JP | 11-157844 | * 6/1999 | ............ C01G 51/04 |
| JP | 2001-206736 | 7/2001 | |
| JP | 2002-81354 | 3/2002 | |
| JP | 2003-77544 | 3/2003 | |
| JP | 2004-349253 | 12/2004 | |
| JP | 2006-24412 | 1/2006 | |
| JP | 2006-24415 | 1/2006 | |
| JP | 2006-306650 | * 11/2006 | ............ C01G 51/00 |
| JP | 2007-018874 | 1/2007 | |

OTHER PUBLICATIONS

Antolini, Journal of the European Ceramic Society 18 (1998): Preparation and Properties of Li-Co-O Compounds, Elsevier, p. 1405-1411.*

Japanese Office Action for corresponding JP2007-236371 issued on Sep. 12, 2012.

* cited by examiner

*Primary Examiner* — Ula C Ruddock
*Assistant Examiner* — Frank Chernow
(74) *Attorney, Agent, or Firm* — K&L Gates LLP

(57) ABSTRACT

A substance includes an oxide including at least one element selected from the group including cobalt Co, nickel Ni, manganese Mn, iron Fe, and copper Cu; and silicon Si chemically bonded to the surface of the oxide. Also, a battery includes a cathode, an anode, and an electrolyte, wherein the cathode includes an oxide including at least one selected from the group including cobalt Co, nickel Ni, manganese Mn, iron Fe, and copper Cu; and a substance including silicon Si chemically bonded to the surface of the oxide.

16 Claims, 1 Drawing Sheet

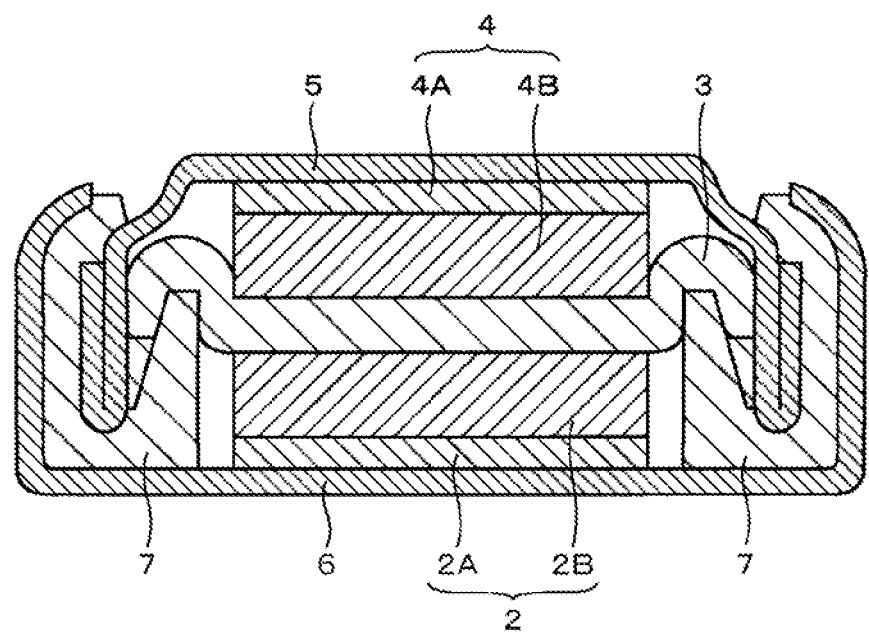

SUBSTANCE AND BATTERY INCLUDING THE SAME

CROSS REFERENCES TO RELATED APPLICATION

The present application claims priority to Japanese Patent Application JP 2007-236371 filed in the Japanese Patent Office on Sep. 12, 2007, the entire contents of which being incorporated herein by reference.

BACKGROUND

The present application relates to a substance suitable as an electrode material, and a battery including the substance, and specifically to a substance composed of oxide particles and silicon Si chemically bonded to the surfaces of the particles, and a battery including the substance.

In recent years, with the remarkable progress and development of portable electronic devices, batteries used for these devices may be increasingly required to have smaller sizes and weights, and higher capacities. For example, lithium secondary batteries respond to such requests. Lithium secondary batteries can have larger capacities than other batteries, but still may require improvements. One solution is the development of cathode materials.

Examples of the cathode material for lithium secondary batteries include those based on chalcogenide such as $Co_3O_4$, $Fe_2O_3$, $Ni_2O_3$, $CoFe_2O_4$, cobalt phosphide, cobalt nitride, manganese vanadate, $Li_4Ti_5O_{12}$ or $Li_6Fe_2O_3$ (for example, see Japanese Patent Application Laid-Open (JP-A) No. 2003-77544). It is known from old time that some chalcogenide materials have a very large capacity. Tarascon et al., processed a chalcogenide material at a nanosize level to make a special electrode structure, and found that metal elements are cycled by being reduced to an oxidation number of almost zero even in a material whose crystal structure is broken by occlusion of lithium Li, or a material incapable of intercalating lithium into the crystals, and thus proved that the large capacity of chalcogenide materials is not based on irreversible reaction.

As a result of this, the research of chalcogenide materials is progressing. In recent years, it has been found that the materials exhibit reversibility without being processed at a nano-size level or made into a special electrode structure, though the cycle characteristics are poor. Accordingly, the chalcogenide materials are expected to give a large capacity of 1600 Wh/l depending on the future study, and are regarded as important materials for future batteries.

However, these materials still have not achieved their theoretical capacities. In addition, sufficient cycle characteristics have not also achieved. In order to solve these problems, there is proposed a method for using a cathode material prepared by mechanically mixing an active material with a carbon material thereby partially combining the active material with the carbon material (for example, see JP-A No. 2006-306650).

Also proposed is a method for improving the cycle characteristics through the use of a solvent including 1,3-dioxolane as the electrolytic solution of a battery (for example, see JP-A No. 2006-24412).

Furthermore, it is disclosed that favorable characteristic is achieved in the discharge capacity and capacity retention rate by decreasing the concentration of silicon Si in cobalt oxide used as the cathode material to 500 ppm or less, wherein the Si is regarded as an impurity in the cathode material (for example, see JP-A No. 11-157844).

SUMMARY

However, according to the method described in JP-A No. 2006-306650, the capacity and cycle characteristics are improved to a degree, but the degree of the improvement is not satisfactory. In particular, the cycle characteristics have not reached a satisfactory level.

The method described in JP-A No. 2006-24412 provides better cycle characteristics than other cases wherein other solvent is used as the electrolytic solution. However, the long-term cycle characteristics are not satisfactory.

The method described in JP-A No. 11-157844 provides acceptable characteristics in the discharge capacity and capacity retention rate, but the level is not satisfactory.

The capacity can be brought closer to the theoretical value by decreasing the particle size of the active material, but the cycle characteristics generally tend to deteriorate. The methods described in JP-A No. 2006-306650, JP-A No. 2006-24412 and JP-A No. 11-157844 also find it difficult to provide satisfactory cycle characteristics.

Accordingly, it is desirable to provide a battery having a high capacity and excellent cycle characteristics, and a substance suitable as the material of the battery.

According to an embodiment, there is provided a substance including: an oxide including at least one selected from the group including cobalt Co, nickel Ni, manganese Mn, iron Fe and copper Cu; and silicon Si chemically bonded to the surface of the oxide.

According to another embodiment, there is provided a battery including a cathode, an anode, and an electrolyte, the cathode including: an oxide including at least one selected from the group including cobalt Co, nickel Ni, manganese Mn, iron Fe and copper Cu, and a substance including silicon Si chemically bonded to the surface of the oxide.

According to an embodiment, the surface conditions of the substance can be stabilized by silicon Si chemically bonded to the surface of the oxide including at least one selected from the group including cobalt Co, nickel Ni, manganese Mn, iron Fe and copper Cu.

According to an embodiment, the surface conditions of the substance can be stabilized, whereby a battery having a high capacity and excellent cycle characteristics can be provided.

Additional features and advantages are described herein, and will be apparent from the following Detailed Description and the figures.

BRIEF DESCRIPTION OF THE FIGURES

FIG. 1 is a cross sectional view showing the structure of the secondary battery including the substance according to one embodiment.

DETAILED DESCRIPTION

With reference to the accompanying drawing, embodiments of the present application will be described.

The substance according to an embodiment is composed of silicon Si chemically bonded to the surface of an oxide.

The oxide includes least one element selected from the group including of cobalt Co, nickel Ni, manganese Mn, iron Fe and copper Cu. The oxide is, for example, a substance having the average composition expressed by Chemical Formula 1.

$Li_aM1_{1-b}M2_bO_c$ (Chemical Formula 1)

(Wherein M1 represents at least one selected from the group including nickel Ni, cobalt Co, manganese Mn, iron Fe, and copper Cu. M2 represents at least one selected from metal elements and semimetal elements other than the element M1; a, b, and c are molar ratios, and $0 \leq a < 3.6$, $0 \leq b < 1$, and $1 \leq c \leq 2$.)

Through electrochemical oxidation reduction reaction of the oxide with lithium, the element M1 is reduced to have a valence of 1 or less and almost zero, so that the element M1 presents in a metallic state. In the same manner as the element M1, the element M2 may be reduced to have a valence of 1 or less and almost zero through the electrochemical oxidation reduction reaction with lithium, or may not contribute to the reaction and whose valence may not change depending on the type of the M2 and combination with the element M1.

More specifically, the substance has a reaction mechanism expressed by, for example, Chemical Formula 2. Chemical Formula 2 typically shows the oxidized state of the element M1 (left side) and the reduced state (right side), and may show other states during the reaction.

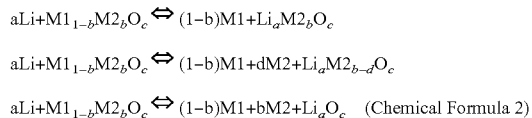

$$aLi + M1_{1-b}M2_bO_c \Leftrightarrow (1-b)M1 + Li_aM2_bO_c$$

$$aLi + M1_{1-b}M2_bO_c \Leftrightarrow (1-b)M1 + dM2 + Li_aM2_{b-d}O_c$$

$$aLi + M1_{1-b}M2_bO_c \Leftrightarrow (1-b)M1 + bM2 + Li_aO_c \quad \text{(Chemical Formula 2)}$$

(wherein $0 < d < b$.)

Specific examples of the oxide include CoO, FeO, CuO, NiO, $Fe_2O_3$, $Co_3O_4$, $Li_2CoO$, $Ni_xMg_{6-x}MnO_8$, $LiNiVO_4$, $Co_2SnO_4$, and $Mn_3O_4$. In Chemical Formulae 1 and 2, the composition ratio of c is not limited to the stoichiometric composition of the compound including lithium or the element M1 or M2, and may be deviated from the stoichiometric composition.

According to an embodiment, Si is chemically bonded to the surface of an oxide, whereby the surface state is stabilized. Accordingly, through the use of the substance as, for example, as the cathode material of a battery, the battery has improved cycle characteristics.

When the substance is used as the cathode material of a battery, the average particle size of the substance is preferably 0.005 μm or more and 1 μm or less. In general, when a cathode active material having an average particle size of 1 μm or less is used as the cathode material of a battery, the battery has a high capacity but gives unsatisfactory cycle characteristics. Through the use of the substance according to an embodiment, satisfactory cycle characteristics can be provided even when an oxide having an average particle size of 1 μm or less is used. Accordingly, a battery having a high capacity and excellent cycle characteristics can be provided. On the other hand, if the average particle size is less than 0.005 μm, the handleability of the material itself deteriorates. The average particle size may be measured by the particle size distribution measurement method according to the laser diffraction scattering method for fine ceramic materials defined in JIS R 1629.

The element ratio of Si on the oxide surface is preferably 3% or more and 90% or less. If the ratio is less than 3%, the effect of surface stabilization becomes smaller, on the other hand, if higher than 90%, the Si compound layer has a larger thickness to have excellent surface stability, but exhibits poor battery properties, in particular in the load characteristics. The element ratio of Si on the surface may be, for example, determined by ESCA (Electron Spectroscopy for Chemical Analysis).

The active material described in JP-A No. 11-157844 also includes Si on the surface of the active material, but the element ratio of Si on the surface is as low as 1% or less when the concentration of Si is 500 ppm or less as described in JP-A No. 11-157844, which makes it difficult to achieve the effect. In JP-A No. 11-157844, Si occurs as an impurity and has no chemical bond. In the substance according to this embodiment, Si is deliberately introduced to and chemically bonded to the oxide surface.

The bonding state of Si on the oxide surface is, for example, M1-O-Si-R (wherein M1 represents the element M1 included in Chemical Formula 1, and R represents a carbon chain or a carbon chain having a functional group). In the present description, such substance including Si bonded to a carbon chain or a carbon chain having a functional group may be hereinafter referred to as substance A for convenience sake.

Alternatively, the bonding state of Si on the oxide surface is, for example, M1-O-Si-O (wherein M1 represents the element M1 included in Chemical Formula 1). More specifically, an $SiO_2$ layer is formed on the oxide surface. The layer can further stabilize the surface of the substance. In the present description, the substance formed an $SiO_2$ layer may be hereinafter referred to as substance B for convenience sake. The $SiO_2$ layer of the substance B is formed by burning and removing the carbon chain Rs on the substance A.

It is preferable that carbon is uniformly distributed on the surface of the substance. As a result of this, the surface stability and electrical conductivity can be increased, and more favorable cycle characteristics can be provided. Uniform distribution of carbon refers to a state where carbon is distributed on the surface of the substance in an almost constant proportion. In the present description, the substance including carbon uniformly distributed on its surface may be hereinafter referred to as substance C for convenience sake. The carbon distributed on the surface of the substance C is the residual carbon chain Rs remaining on the surface of the substance A after carbonization.

In a common manufacturing process of a battery, an active material is subjected to ball mill crushing together with a carbon material used as the conductive material. Therefore, some active materials have carbon on their surfaces, but the distribution of the carbon is uneven because the formation of a uniform carbon layer on the surface of the active material is difficult under ball mill crushing. Through the observation of the surface of the substances by SEM (Scanning Electron Microscope), the active material including carbon which has been unevenly distributed on its surface by ball mill crushing can be distinguished from the substance C including carbon uniformly distributed on its surface according to an embodiment.

Identification of the substances A, B, and C is described below. The substances A has residual organic chains (carbon chain Rs) on its surface, so that shows weight reduction under thermogravimetric analysis in air, and shows a peak position of Si2p spectrum around 102.8 eV under ESCA analysis, and can be detected. The substance B does not show weight reduction under thermogravimetric analysis in air, and shows a peak position of Si2p spectrum around 103.2 eV under ESCA analysis, and can be detected. The substance C has residual carbon C on its surface, so that shows weight reduction under thermogravimetric analysis in air, and shows a peak position of Si2p spectrum around 103.2 eV under ESCA analysis, and can be detected.

The substance may be manufactured by, for example, reacting the above-described oxide with a Si compound expressed by a general Chemical Formula $R-Si-(OR')_3$ (wherein R represents a carbon chain or a carbon chain having a functional group, and R' represents a carbon chain). Examples of the Si compound include hexyltrimethoxysilane $((CH_3O)_3SiC_6H_{13})$. Specifically, the Si compound is hydrolyzed by moisture to make silanol, and then partially condensed to make an oligomer. Subsequently, the Si compound is adsorbed on the oxide surface via hydrogen bonds, and then subjected to heat treatment to cause dehydration condensation reaction thereby forming strong chemical bonds between the surfaces of the oxide particles and Si. Thus the substance A can be prepared. Adsorption of the Si compound on the oxide surface is preferably conducted by, for example, a wet process. As a result of this, the Si compound can be almost uniformly adsorbed on the oxide surface.

As necessary, the substance A may be heated at an appropriate temperature of, for example, 300° C. or higher. Through the heating treatment, the carbon chain moiety Rs are burned to be removed, and an $SiO_2$ layer is formed on the surface of the substance to make the substance B. The carbon chain moiety Rs are efficiently burned to be removed by keeping, for example, an oxygen atmosphere during the heat treatment.

Alternatively, in order to make the substance C, a reducing atmosphere such as a nitrogen atmosphere is kept during the heat treatment thereby carbonizing the carbon chain moiety bonded to the Si to almost uniformly distribute carbon C on the surface.

The substance is used, for example, as a cathode material for the below-described secondary battery.

FIG. 1 shows the sectional structure of the secondary battery including the substance according to an embodiment. The secondary battery is of so-called coin type, and has a structure wherein a disk-shaped cathode 2 housed in an exterior can 6 and a disk-shaped anode 4 housed in an exterior cup 5 are stacked with a separator 3 therebetween. The separator 3 is impregnated with an electrolytic solution which is a liquid electrolyte, and the rims of the exterior can 6 and the exterior cup 5 are crimped together with a gasket 7 therebetween to be closed. The exterior can 6 and the exterior cup 5 are composed of, for example, a metal such as stainless steel or aluminum Al.

The cathode 2 includes, for example, a cathode collector 2A, and a cathode active material layer 2B formed on the cathode collector 2A. The cathode collector 2A is composed of, for example, a metal foil such as a copper foil, a nickel foil, or a stainless steel foil. The cathode active material layer 2B contains, for example, the substance according to this embodiment as the cathode active material, and, as necessary, may include a conductive agent such as carbon black or graphite, and a binder such as polyvinylidene fluoride. The cathode active material layer 2B may further include other cathode active material.

The anode 4 includes, for example, an anode collector 4A and an anode active material layer 4B formed on the anode collector 4A. The anode collector 4A is composed of, for example, a metal foil such as a copper foil, a nickel foil, or a stainless steel foil.

The anode active material layer 4B includes, for example, one or more anode active materials selected from anode materials capable of occluding/releasing lithium, metallic lithium, and lithium alloys, and includes, as necessary, a binder such as polyvinylidene fluoride. Examples of the anode material capable of occluding/releasing lithium include carbon materials, metal compounds, tin, tin alloys, silicon, silicon alloys, or conductive polymers. These materials may be used alone or in combination of two or more thereof. Examples of the carbon material include graphite, non-graphitizable carbon, or graphitizable carbon. Examples of the metal compound include oxides such as lithium titanium complex oxide ($Li_4Ti_5O_{12}$) having a spinel structure, tungsten oxide ($WO_2$), niobium oxide ($Nb_2O_5$), or tin oxide (SnO). Examples of the conductive polymer include polyacetylene or polypyrrole. Among them, carbon materials are preferable, because they scarcely cause the variation of the crystal structure during charge and discharge thereby providing favorable cycle characteristics.

The separator 3 isolates the cathode 2 from the anode 4, and passes lithium ions deliberately while preventing short circuits caused by the contact between the electrodes. The separator 3 is composed of, for example, a porous film made of a synthetic resin such as polytetrafluoroethylene, polypropylene, or polyethylene, or a porous film made of an inorganic material such as a nonwoven ceramic fabric. Two or more of these porous film may be laminated.

The electrolytic solution is a solution of an electrolyte salt in a solvent, and the electrolyte salt causes electrolytic dissociation to exhibit ion conductivity. Examples of the electrolyte salt include lithium salts such as lithium hexafluorophosphate ($LiPF_6$), lithium perchlorate ($LiClO_4$), lithium hexafluoroarsenate ($LiAsF_6$), lithium boron tetrafluoride ($LiBF_4$), lithium trifluoromethanesulfonate ($LiCF_3SO_3$), or lithium bis(trifluoromethanesulfonyl)imide ($LiN(CF_3SO_2)_2$). The electrolyte salts may be used alone, or in combination of two or more thereof.

The solvent is preferably a nonaqueous solvent such as propylene carbonate, ethylene carbonate, butylene carbonate, vinylene carbonate, Y-butyrolactone, sulfolane, 1,2-dimethoxy ethane, 1,2-diethoxy ethane, 2-methyltetrahydrofuran, 1,3-dioxolane, 3-methyl-1,3-dioxolane, methyl propionate, methyl butyrate, dimethyl carbonate, diethyl carbonate, or dipropyl carbonate. These solvents may be used alone, or in combination of two or more thereof.

The secondary battery may be manufactured by, for example, as described below.

In the first place, for example, the above-described oxide is mixed with, as necessary, a conductive agent and a binder to prepare a cathode mixture, and the mixture is dispersed in a solvent such as N-methyl-2-pyrrolidone to make a paste. The paste is applied to the cathode collector 2A, the solvent is dried, and compress ion molded with a roll press to form the cathode active material layer 2B. The cathode 2 is thus obtained.

In the next place, for example, an anode active material is mixed with, as necessary, a binder to prepare an anode mixture, and the mixture is dispersed in a solvent such as N-methyl-2-pyrrolidone to make a paste. The paste is applied to the anode collector 4A, the solvent is dried, and compression molded with a roll press to form the anode active material layer 4B. The anode 4 is thus obtained. Alternatively, for example, the anode active material layer 4B is formed on the anode collector 4A by vapor deposition or plating, and thus the anode 4 is obtained.

Thereafter, the anode 4 and the separator 3 are placed in this order at the center of the exterior cup 5, and an electrolytic solution is poured from the top of the separator 3. The exterior cup 5 is covered with the exterior can 6 including the cathode 2, and they are crimped together with the gasket 7 therebetween. The secondary battery shown in FIG. 1 is thus formed.

When the secondary battery is discharged, for example, lithium ions leave the anode 4, or metallic lithium converts into lithium ions and flows out from the anode 4, and react with the cathode active material layer 2B via the electrolytic solution. When the battery is charged, for example, lithium ions leave the cathode active material layer 2B, and are occluded by the anode 4 via the electrolytic solution, or deposit in the form of metallic lithium. At that time, in the cathode active material layer 2B, the above-described substance causes oxidation reduction reaction with lithium. After complete discharge, at least one element selected from the group including cobalt Co, nickel Ni, manganese Mn, iron Fe and copper Cu included in the substance is reduced to have a valence of 1 or less and almost zero, and thus generates lithium oxide and a reduced metal such as cobalt Co, nickel Ni, manganese Mn, iron Fe, and copper Cu.

As described above, the substance according to an embodiment has excellent surface stability because Si is chemically bonded to the surface of the substance. Accordingly, when the substance is used as a cathode material of a battery, favorable cycle characteristics can be provided. Even when a substance having a small average particle size is used as the cathode material of the battery, the cycle characteristics little deteriorates, so that a high capacity and excellent cycle characteristics may be provided. In addition, carbon C is almost uniformly distributed on the surface of the active material to improve the electrical conductivity, which results in better cycle characteristics.

EXAMPLES

The following examples are illustrative of the present application according to an embodiment.

Example 1

The oxides used herein are cobalt oxides (II, III). The cobalt oxide having an average particle size of 1.0 μm was purchased from Aldrich, and the cobalt oxide having an average particle size of 0.01 μm was purchased from Soekawa Chemical Co., Ltd. Those having other particle size were obtained by heating cobalt nitrate in air at an appropriate temperature. The average particle size was measured using LA-920 (manufactured by Horiba, Ltd.) by the particle size distribution measurement method according to the laser diffraction scattering method for fine ceramic materials defined in JIS R 1629. These cobalt oxides are presumed to be $Co_3O_4$ on the basis of the X ray diffraction profile.

Thereafter, the cobalt oxide powder was treated with an Si compound (R—Si—(OR')$_3$) to form chemical bonds of Si on the surfaces of the cobalt oxide particles. The Si compound used herein is hexyltrimethoxysilane (($CH_3O)_3SiC_6H_{13}$). The treatment with the Si compound was conducted by a wet process. Specifically, the cobalt oxide powder was stirred in a 1.5 wt % aqueous solution of hexyltrimethoxysilane at room temperature for 10 hours, filtered, and then dried at 110° C. Thus a substance composed of cobalt oxide and Si chemically bonded to the surface of the oxide was obtained. The bonding state on the particle surfaces of the substance was Co—O—Si—R, and the substance corresponds to the substance A.

Example 2

The substance obtained by the Si compound treatment in Example 1 was treated in a nitrogen atmosphere at 300° C. for 12 hours to obtain a substance having reduced carbon chains (referred to —$C_6H_{13}$ herein) on its surface. The bonding states on the particle surfaces of the substance were Co—O—Si—O and C, and the substance corresponds to the substance C.

Example 3

The substance obtained by the Si compound treatment in Example 1 was treated in a oxygen atmosphere at 300° C. for 12 hours to obtain a substance having burned carbon chains (referred to —$C_6H_{13}$ herein) on its surface. The bonding state on the particle surfaces of the substance was Co—O—Si—O, and the substance corresponds to the substance B.

Example 4

A substance was obtained in the same manner as Example 2, except that the concentration of the aqueous solution of hexyltrimethoxysilane used for the Si compound treatment was changed to 0.11 wt %. The bonding states on the particle surfaces of the substance were Co—O—Si—O and C, and the substance corresponds to the substance C.

Example 5

A substance was obtained in the same manner as Example 2, except that the concentration of the aqueous solution of hexyltrimethoxysilane used for the Si compound treatment was changed to 0.19 wt %. The bonding states on the particle surfaces of the substance were Co—O—Si—O and C, and the substance corresponds to the substance C.

Example 6

A substance was obtained in the same manner as Example 2, except that the concentration of the aqueous solution of hexyltrimethoxysilane used for the Si compound treatment was changed to 3.0 wt %. The bonding states on the particle surfaces of the substance were Co—O—Si—O and C, and the substance corresponds to the substance C.

Example 7

A substance was obtained in the same manner as Example 2, except that the concentration of the aqueous solution of hexyltrimethoxysilane used for the Si compound treatment was changed to 3.4 wt %. The bonding states on the particle surfaces of the substance were Co—O—Si—O and C, and the substance corresponds to the substance C.

Example 8

A substance was obtained in the same manner as Example 2, except that a cobalt oxide having an average particle size of 0.005 μm was used. The bonding states on the particle surfaces of the substance were Co—O—Si—O and C, and the substance corresponds to the substance C.

Example 9

A substance was obtained in the same manner as Example 2, except that a cobalt oxide having an average particle size of 0.01 μm was used. The bonding states on the particle surfaces of the substance were Co—O—Si—O and C, and the substance corresponds to the substance C.

Example 10

A substance was obtained in the same manner as Example 2, except that a cobalt oxide having an average particle size of 1 μm was used. The bonding states on the particle surfaces of the substance were Co—O—Si—O and C, and the substance corresponds to the substance C.

Example 11

A substance was obtained in the same manner as Example 2, except that a cobalt oxide having an average particle size of 2 µm was used. The bonding states on the particle surfaces of the substance were Co—O—Si—O and C, and the substance corresponds to the substance C.

Example 12

A substance was obtained in the same manner as Example 2, except that the concentration of the aqueous solution of hexyltrimethoxysilane used for the Si compound treatment was changed to 0.04 wt %. The bonding states on the particle surfaces of the substance were Co—O—Si—O and C, and the substance corresponds to the substance C.

Example 13

A substance was obtained in the same manner as Example 2, except that the concentration of the aqueous solution of hexyltrimethoxysilane used for the Si compound treatment was changed to 3.53 wt %. The bonding states on the particle surfaces of the substance were Co—O—Si—O and C, and the substance corresponds to the substance C.

<Comparison 1>

A substance was obtained in the same manner as Example 1, except that a cobalt oxide having an average particle size of 0.01 µm was used, and the Si compound treatment was not conducted. The bonding states on the particle surfaces of the substance were Co—O and Si. The ratio of Si on the surface was 1% or less, which is an impurity level.

<Comparison 2>

A substance was obtained in the same manner as Comparison 1, except that a cobalt oxide having an average particle size of 0.5 µm was used.

<Comparison 3>

A substance was obtained in the same manner as Comparison 1, except that a cobalt oxide having an average particle size of 1 µm was used.

<Comparison 4>

The substance of Comparison 3 was milled in a ball mill together with graphite, and thus a substance was obtained. The graphite used herein is Ketjen Black (KB). During the milling treatment, the weight ratio between the cobalt oxide, KB, and $ZrO_2$ balls having a diameter of 5 mm was 8:2:170.

The bonding states on the particle surfaces of the substance were Co—O, Si, and C. The ratio of Si on the surface was 1% or less, which is an impurity level.

The element ratio of Si on the surfaces of the substances of Examples 1 to 13 and Comparisons 1 to 4 were calculated from the spectra of O1s, $Co2p_{3/2}$, and Si2p using an X ray photoelectron spectrometer (Quantera SXM, manufactured by Ulvac-Phi, Incorporated). The results are shown in Table 1.

In the next place, coin type batteries as shown in FIG. 1 were made using the above substances as the cathode materials.

At that time, the cathode 2 was made as follows. In the first place, the substances of Examples 1 to 13 and Comparisons 1 to 4 were mixed with polyvinylidene fluoride as the binder using N-methyl-2-pyrrolidone as the solvent, whereby a cathode mixture paste was obtained. The proportion between the substance and the binder was 9:1 in terms of the mass ratio. In the next place, the cathode mixture was applied to the cathode collector 2A composed of a copper foil, and dried to form the cathode active material layer 2B. The assembly was stamped into a disk having a diameter of 16 mm to obtain the cathode 2.

The anode 4 was a disk-shaped metallic lithium sheet having a diameter of 15 mm, and the electrolytic solution was a 1 mol/kg solution of lithium trifluoromethylsulfonideimide (LiTFSI) as the lithium salt in a mixed solvent of 1,3-dioxolane and 1,2-dimethoxyethane at a volume ratio of 1:1.

The batteries made as described above were subjected to charge/discharge test, and the initial discharge capacity and cycle characteristics were measured as follows. In the first place, at a temperature of 23° C., a battery was discharged at a constant current of 1.0 mA until the voltage reached 0.9 V, subsequently the battery was charged at a constant current of 1.0 mA until the voltage reached 3.0 V, and then charged at a constant voltage of 3.0 V until the current reached 0.1 mA or lower. The charge and discharge cycle was repeated. The cycle characteristics was determined from the ratio of the discharge capacity after the 20th cycle to the discharge capacity after the first cycle (initial discharge capacity) (discharge capacity after the 20th cycle/discharge capacity after the first cycle)×100 (%). The results are shown in Table 1.

TABLE 1

| | Si COMPOUND TREATMENT | HEAT TREATMENT AFTER Si COMPOUND TREATMENT | | | BONDING STATE ON PARTICLE SURFACES | ELEMENT RATIO OF Si ON PARTICLE SURFACES [%] | COBALT OXIDE AVERAGE PARTICLE SIZE [µm] | INITIAL DISCHARGE CAPACITY [mAh/g] | DISCHARGE CAPACITY RETENTION [%] |
|---|---|---|---|---|---|---|---|---|---|
| | | TEMPERATURE [° C.] | ATMOSPHERE | BALL MILLING | | | | | |
| EXAMPLE 1 | TREATED | — | — | — | Co—O—Si—R | 40 | 0.5 | 762 | 93 |
| EXAMPLE 2 | TREATED | 300° C. | $N_2$ | — | Co—O—Si—O, C | 40 | 0.5 | 763 | 95 |
| EXAMPLE 3 | TREATED | 300° C. | $O_2$ | — | Co—O—Si—O | 40 | 0.5 | 764 | 94 |
| EXAMPLE 4 | TREATED | 300° C. | $N_2$ | — | Co—O—Si—O, C | 3 | 0.5 | 761 | 93 |
| EXAMPLE 5 | TREATED | 300° C. | $N_2$ | — | Co—O—Si—O, C | 5 | 0.5 | 763 | 94 |
| EXAMPLE 6 | TREATED | 300° C. | $N_2$ | — | Co—O—Si—O, C | 80 | 0.5 | 765 | 94 |
| EXAMPLE 7 | TREATED | 300° C. | $N_2$ | — | Co—O—Si—O, C | 90 | 0.5 | 763 | 94 |
| EXAMPLE 8 | TREATED | 300° C. | $N_2$ | — | Co—O—Si—O, C | 40 | 0.005 | 784 | 95 |
| EXAMPLE 9 | TREATED | 300° C. | $N_2$ | — | Co—O—Si—O, C | 40 | 0.01 | 778 | 94 |
| EXAMPLE 10 | TREATED | 300° C. | $N_2$ | — | Co—O—Si—O, C | 40 | 1.0 | 755 | 94 |
| EXAMPLE 11 | TREATED | 300° C. | $N_2$ | — | Co—O—Si—O, C | 40 | 2.0 | 745 | 95 |
| EXAMPLE 12 | TREATED | 300° C. | $N_2$ | — | Co—O—Si—O, C | 1 | 0.5 | 764 | 88 |
| EXAMPLE 13 | TREATED | 300° C. | $N_2$ | — | Co—O—Si—O, C | 93 | 0.5 | 755 | 94 |
| COMPARISON 1 | UNTREATED | — | — | — | Co—O, Si | 1 | 0.01 | 776 | 87 |
| COMPARISON 2 | UNTREATED | — | — | — | Co—O, Si | 1 | 0.5 | 763 | 89 |

TABLE 1-continued

| | Si COMPOUND TREATMENT | HEAT TREATMENT AFTER Si COMPOUND TREATMENT | | BALL MILLING | BONDING STATE ON PARTICLE SURFACES | ELEMENT RATIO OF Si ON PARTICLE SURFACES [%] | COBALT OXIDE AVERAGE PARTICLE SIZE [μm] | INITIAL DIS-CHARGE CAPACITY [mAh/g] | DISCHARGE CAPACITY RETENTION [%] |
|---|---|---|---|---|---|---|---|---|---|
| | | TEMPERATURE [° C.] | ATMOSPHERE | | | | | | |
| COMPARISON 3 | UNTREATED | — | — | — | Co—O, Si | 1 | 1.0 | 755 | 90 |
| COMPARISON 4 | UNTREATED | — | — | MILLED | Co—O, Si, C | 1 | 0.5 | 778 | 89 |

Table 1 indicates that Examples 1 to 13 treated with the Si compound showed better discharge capacity retentions than Comparisons 1 to 4 untreated with the Si compound. The reason for this is considered that the Si chemical bond for stabilizing the cobalt oxide surface was absent in Comparisons 1 to 4.

The result of Example 3 indicate that the surface stability and the discharge capacity retention were improved by the formation of the $SiO_2$ on the cobalt oxide surface through the treatment at 300° C. in an oxygen atmosphere after the surface treatment by the Si compound. The result of Example 2 indicate that the initial discharge capacity and the discharge capacity retention were improved by uniformly distributing carbon on the cobalt oxide surface through the treatment at 300° C. in a nitrogen atmosphere.

The results of Examples 4 and 12 indicate that the element ratio of Si on the surface is preferably 3% or more. This is because that the effect of surface stabilization was lower in Example 12 wherein the element ratio of Si on the surface was less than 3%. The results of Examples 7 and 13 indicate that the element ratio of Si on the surface is preferably 90% or less. In Example 12 wherein the element ratio of Si on the surface was more than 90%, the discharge capacity retention was favorable owing to the excellent surface stability, but the discharge capacity was lower than Example 7 employing the same average particle size.

In general, as the decrease of the particle size, the initial capacity increases but the cycle characteristics markedly deteriorates. For example, as indicated by the results of Comparisons 1 and 3, the discharge capacity retention of Comparison 1 having a smaller average particle size was lower than Comparison 3. On the other hand, the average particle sizes in Examples 8 and 9 were as small as 0.005 μm and 0.01 μm, respectively, but the discharge capacity retention was equivalent to those achieved with larger average particle sizes in Examples 10 and 11, indicating that a high capacity is compatible with high cycle characteristics.

The present application has been described above according to an embodiment, but the present application is not limited to this embodiment. It should be understood by those skilled in the art that various modifications, combinations, sub-combinations and alternations may occur depending on design requirements and other factors insofar as they are within the scope of the appended claims or the equivalents thereof. For example, the present application may be applied to other controls such as contour correction instead of control of input/output luminance characteristics for high quality picture producing control. For example, the electrolytic solution used as a liquid electrolyte in the above-described embodiment and examples may be replaced with other electrolyte. Examples of other electrolytes include a gel electrolyte composed of an electrolytic solution retained in a polymer compound, a polymer electrolyte composed of an electrolyte salt dispersed in an ion-conductive polymer compound, an inorganic solid electrolyte composed of ion-conductive ceramic, ion-conductive glass, or ionic crystals, a fused salt electrolyte, or mixtures thereof.

Examples of the polymer compounds for gel electrolytes include polyvinylidene fluoride or polymers thereof, or polyacrylonitrile or polymers thereof. Examples of the polymer electrolytes include a dispersion of $LiSO_3CF_3$ in polyethylene oxide, or those composed of ionomers. Examples of the inorganic solid electrolytes include β"-alumina, nitride lithium, NASiCON type compounds (see "High Conductivity Solid Ionic Conductors—Recent Trends and Applications", Takehiko Takahashi, World Scientific, Singapore, 1989), or LISICON type compounds (see "High Conductivity Solid Ionic Conductors—Recent Trends and Applications", Takehiko Takahashi, World Scientific, Singapore, 1989).

In the above-described embodiment and examples, secondary batteries of coin type are specifically illustrated. The present application is also applicable to other secondary batteries having other shapes, such as those of cylinder type, button type, or square type, and those having other structure, such as coiled ones. In addition, the present application is also applicable to other batteries such as primary batteries.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A cathode active material comprising:
   oxide particles, the oxide including an element selected from the group consisting of cobalt, nickel, manganese, iron, and copper; and
   silicon chemically bonded to a surface of said oxide particles,
   wherein a bonding state of silicon on the surface of said oxide particles is M1-O—Si—R or M1-O—Si—O, wherein M1 represents the element included in the oxide and R represents a carbon chain or a carbon chain having a functional group,
   wherein an element ratio of said silicon on the surface of said oxide particles is 3% or more and 90% or less, and
   wherein the average particle size of the oxide particles is 0.005 μm or more and 0.5 μm or less.

2. The cathode active material according to claim 1, wherein said oxide is cobalt oxide.

3. The cathode active material according to claim 1, wherein said element included in said oxide is reduced to have a valence of 1 or less by electrochemical oxidation reduction reaction with lithium.

4. The cathode active material according to claim 1, wherein said silicon is bonded in a state of $SiO_2$.

5. The cathode active material according to claim 1, wherein carbon is uniformly distributed on the surface of said oxide particles.

6. The cathode active material according to claim 1, wherein the oxide is selected from the group consisting of CoO, FeO, CuO, NiO, $Fe_2O_3$, $CO_3O_4$, $Li_2CoO$, $Ni_xMg_{6-x}MnO_8$, $LiNiVO_4$, $Co_2SnO_4$, and $Mn_3O_4$.

7. The cathode active material according to claim 1, wherein the bonding state of silicon on the surface of said oxide particles is associated with a discharge capacity retention ratio of 93% or more.

8. The cathode active material according to claim 1, wherein the bonding state of silicon on the surface of said oxide particles is associated with an initial discharge capacity of 761 mAh/g or more.

9. A battery comprising a cathode, an anode, and an electrolyte, wherein said cathode includes a cathode active material comprising:
   oxide particles, the oxide including an element selected from the group consisting of cobalt, nickel, manganese, iron, and copper; and
   silicon chemically bonded to a surface of said oxide particles,
   wherein a bonding state of silicon on the surface of said oxide particles is M1-O—Si—R or M1-O—Si—O,
   wherein M1 represents the element included in the oxide and R represents a carbon chain or a carbon chain having a functional group,
   wherein an element ratio of said silicon on the surface of said oxide particles is 3% or more and 90% or less, and
   wherein the average particle size of said oxide particles is 0.005 μm or more and 0.5 μm or less.

10. The battery according to claim 9, wherein said oxide is cobalt oxide.

11. The battery according to claim 9, wherein the element included in said oxide is reduced to have a valence of 1 or less by electrochemical oxidation reduction reaction with lithium.

12. The battery according to claim 9, wherein said silicon is bonded in the state of $SiO_2$.

13. The battery according to claim 9, wherein carbon is uniformly distributed on the surface of said oxide particles.

14. The battery according to claim 9, wherein the oxide is selected from the group consisting of CoO, FeO, CuO, NiO, $Fe_2O_3$, $Co_3O_4$, $Li_2CoO$, $Ni_xMg_{6-x}MnO_8$, $LiNiVO_4$, $Co_2SnO_4$, and $Mn_3O_4$.

15. The battery according to claim 9, wherein the bonding state of silicon on the surface of said oxide particles is associated with a discharge capacity retention ratio of 93% or more.

16. The battery according to claim 9, wherein the bonding state of silicon on the surface of said oxide particles is associated with an initial discharge capacity of 761 mAh/g or more.

* * * * *